US006423810B1

(12) United States Patent
Huang et al.

(10) Patent No.: US 6,423,810 B1
(45) Date of Patent: Jul. 23, 2002

(54) HIGH STRENGTH, LONG-OPEN TIME STRUCTURAL POLYURETHANE ADHESIVE AND METHOD OF USE THEREOF

(75) Inventors: Jian-ping Huang, Apex; Stephen R. Webb, Clayton; Miriam H. Zietlow, Apex, all of NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/777,209

(22) Filed: Feb. 5, 2001

(51) Int. Cl.[7] .............................................. C08G 18/48
(52) U.S. Cl. .............................. 528/77; 528/76; 528/75; 528/905; 528/80; 528/60; 525/131
(58) Field of Search ........................... 528/76, 77, 75, 528/905, 80, 60; 525/131

(56) References Cited

U.S. PATENT DOCUMENTS

| | | |
|---|---|---|
| 3,274,160 A | 9/1966 | Ellegast et al. |
| 3,642,943 A | 2/1972 | Noel |
| 3,714,127 A | 1/1973 | Fabis et al. |
| 4,156,064 A | 5/1979 | Flakenstein et al. |
| 4,182,898 A | 1/1980 | Fujiwara et al. |
| 4,487,909 A | 12/1984 | Couglin et al. |
| 4,554,340 A | 11/1985 | Heusch et al. |
| 4,743,672 A | 5/1988 | Goel |
| 4,826,885 A * | 5/1989 | Tsai |
| 5,002,806 A | 3/1991 | Chung |
| 5,166,300 A | 11/1992 | Rumon et al. |
| 5,606,003 A | 2/1997 | Wang et al. |
| 5,998,538 A * | 12/1999 | Meckel et al. |

FOREIGN PATENT DOCUMENTS

| | | |
|---|---|---|
| EP | 0068209 | 3/1985 |
| EP | 0 304 083 | 3/1994 |
| WO | WO 93/18074 | 9/1993 |

OTHER PUBLICATIONS

"Phase Structure of Polyether Polyol–4,4'–diphenylmethane Diisocyanate–Based Reaction Injection Molded (RIM) Polyurethanes". Nishimura, H.; Kojima, H.; Yarita, T.; Noshiro, M.; Res. Dev. Div., Asahi Glass Co., Ltd., Yokohama, Japan. *Polym. Eng. Sci.* (1986), 26(9), 585–92.
"Comparison of 1, 4–butanediol and Ethylene Glycol Crosslinkers in RIM and RRIM Urethane Elastomers". Lin, I.Sioun; Biranowski, Jerome; Gasman, R. C. Polym. Dep., GAF Corp., Wayne, NJ USA. *Org. Coat. Plast. Chem.* (1981), 44 280–3.
"Reaction Injection Molded Polyurethanes Employing Aliphatic Amine Chain Extenders". Vanderhider, James A.; Lancaster, Gerald M. Dow Chemical Co., USA U.S. (1981).
"Effect of a Diamine Additive on the Structure–Property Relationships of RIM Polyurethane Elastomers". Blackwell, John; Quay, Jeffrey; Turner, Robert B. Dep.Macromol. Sci., Case Western Reserve Univ., Cleveland, OH, USA. *Polym. Eng. Sci.* (1983), 232(15), 816–19.
"Comparison of 1,4–butanediol and Ethylene Glycol Crosslinkers in RIM and RRIM Urethane Elastomers". Lin, I. Sioun; Biranowski, Jerome; Gasman, R.C. Polym. Dep., GAF Corp., Wayne, NJ USA. *Org. Coat. Plast. Chem.* (1981), 44280–3.
"Polyurethane Microcellular Elastomers. 3. Effect Chain Extenders and Blowing Agent on the Foam Formation Kinetics". Korodi, T.; Tolgyi, S.; Marcu, N.; Tirnaveanu, A. Interprinderea de Spume Poliuretanice, Timisoara, Rom. *Cell.Polym.* (9186), 5(3), 187–97.
"Effects of Modified Liquefied Diphenylmethane–4,4'–diisocyanate on Properties of RIM Polyurethane Elastomers". Wang, Shicai; Li, Baoxia; Wang, Dening. Dep. Applied Chem., Qingdao Univ., Peop. Rep. China. Hecheng Xiangjiao Gongye (1997).
"RIM Foam Meets FR Needs of Big Parts". Kraft, P.; Konkus, D. Stauffer Chem. Co., Dobbs Ferry, NY, USA. *Mod. Plast.* (1987), 64(10), 104, 106.
"Structure–Property Relationships and Morpholoy of Isocyanurate–Containing Urethane Elastomers". Klempner, D.; Frisch, K.C.; Wang, C.L. Polym. Inst., Univ. Detroit, Detroit, MI, USA *Adv. Urethane Sci. Technol.* (1984), 9 102–29.
"Polyurea Dispersions for Rim Applications", Phillips, B.A.; Taylor, R.P. Polyurethane Div., Mobay Chemical Corporation, Pittsburgh, PA *Rubber Chem. Technol.* (1979), 52(4), 864–70.
*Handbook of Adhesive Technology*, Pizzi, A. and K.L. Mittal. Marcel Dekker, Inc. 1994. Pp 408–409.
"Microphase Separation in RIM Polyureas as Studied by Solid–State NMR". Lehmann, Stephan A.; Meltzer, A. Donald; Spiess, Hans Wolfgang. Max–Planck–Institut fur Polymerforschung. Ackermannweg. Mainz, Germany. *J. Polym. Sci.*, Part B: Polym. Phys. (1998).
"Mass Production of High Modulus Urethane Elastomeric Parts". Anon. Engl. Res. Discl. (1977), 106 6–7.

* cited by examiner

*Primary Examiner*—Rachel Gorr
(74) *Attorney, Agent, or Firm*—Miles B. Dearth

(57) ABSTRACT

Disclosed is a two-part polyurethane structural adhesive and method of bonding structural components, that exhibits at least 25 minutes of open time at 32° C. in large beads and cures to high strength under ambient conditions. The adhesive composition in one part is an isocyanate or isocyanate prepolymer and in a second part is a polyol mixture (I) or (II), wherein 75% to 100% by weight of the polyol mixture (I) or (II) are polyols having secondary hydroxyl functionality and the polyol mixture (I) or (II) contains a long chain secondary polyol defined hereinbelow. The polyol mixture in one embodiment is substantially absent short chain polyols having functionality of 2, and includes an amount from 30% to 80 % by weight on total polyol weight in (I) of long chain secondary polyol of molecular weight from 2000 to 12000 and from 20% to 70% by weight on total weight of the polyol mixture and of a short chain secondary polyol with functionality greater than 2 and a molecular weight of from 90 to 800. In another embodiment, 5% to 80% of a long chain secondary polyol of molecular weight of from 2000 to 12000 is present together with 5% to 70% of a short chain secondary polyol having a functionality of greater than 2, and 5% to 70% of a short chain secondary polyol having a functionality of 2 and a molecular weight of from 90–800.

25 Claims, No Drawings

HIGH STRENGTH, LONG-OPEN TIME STRUCTURAL POLYURETHANE ADHESIVE AND METHOD OF USE THEREOF

FIELD OF THE INVENTION

The field of the invention relates to two-part urethane structural adhesives and bonding of structural components therewith such as in the construction, automotive and marine industries.

BACKGROUND OF THE INVENTION

Two-component polyurethane adhesives have long been known. Thus, U.S. Pat. No. 3,274,160 describes the reaction products of polyisocyanates with a mixture containing alcoholic hydroxyl functions.

Polyurethanes obtained from polyester polyol prepolymers which are mixed with low molecular weight polyols and reacted with diisocyanates are described in U.S. Pat. No. 4,182,898.

A method of preparation of polyurethane adhesives using excess diisocyanates, polyols, and optionally chain lengthening agents such as amines is described in U.S. Pat. No. 4,156,064.

U.S. Pat. No. 4,487,909 describes an adhesive based on a polyol, e.g. a polyether polyol. and glycerol as branching agent.

U.S. Pat. No. 4,554,340 describes a polyol mixture for the preparation of polyurethanes from high molecular weight polyalkylene oxides and low molecular weight diols and optionally also isocyanate reactive compounds such as glycerol and diamine.

U.S. Pat. No. 3,714,127 describes two-component polyurethane adhesives based on an isocyanate prepolymer to which an amine is added for increasing the viscosity and ensuring the non-sagging character of the adhesive.

EP 0,068,209 describes a two-component polyurethane adhesive having a polyol component containing a polyester triol or polyether triol, a phenylene diamine, and a tin catalyst. This mixture is reacted with an aromatic diisocyanate.

In U.S. Pat. No. 4,554,340, there is disclosed a polyol mixture for use in the preparation of polyurethane. The polyol mixture comprises a high molecular weight polyalkylene oxide, low molecular weight diol, and optionally isocyanate-reactive compounds including glycerine and diamines. The mixture is particularly characterized in that component (a) is a polyoxyalkylene polyol having an OH-number of from 20 to 210 which contains at least 5% and less than 80%, by weight of terminal oxyethylene blocks, component (b) is a low molecular weight diol mixture having an OH-number of from 1200 to 1650 which has the form of a reaction product of 1 mole of ethylene glycol with from 0.1 to 0.5 moles of propylene oxide U.S. Pat. No. 3,642,943 discloses a solution of polymeric material which contains a mixture of an isocyanate-containing urethane prepolymer and a copolymer of an acrylic monomer and an adduct of an organo-diisocyanate and a hydroxyl alkyl acrylic monomer. The isocyanate-containing urethane prepolymer is prepared by reacting an organo-diisocyanate and a polyol or a mixture of polyols. Various polyols described as being useful in forming the urethane prepolymer include polyether polyols prepared by the addition polymerization of ethylene oxide and/or propylene oxide and a polyol like trimethylol propane. Other polyols mentioned include polyester polyols prepared by copolymerizing a low molecular weight polyol with a polycarboxylic acid.

U.S. Pat. No. 4,743,672 discloses a sag-resistant, two-component polyurethane adhesive comprising a first polyisocyanate component and a second component comprising a polyol, a poly(alkylene oxide) polyamine, and a polyurethane catalyst. The suggested curing component, B-side, contains low molecular weight (40 to 400 molecular weight) chain extender polyols in amounts ranging from 0 to 30% by weight of the total curative component and small amounts (0 to about 5% by weight) of low molecular weight di- or polyamines (aliphatic or aromatic, primary and secondary amines of molecular weight ranging from 60 to 400) for the purpose of sag-resistant property of the adhesive.

U.S. Pat. No. 5,166,300 discloses an adhesive based on a polyurethane prepolymer which is prepared by reacting a specific combination of polyhydroxy compounds and an isocyanate compound. The polyhydroxy compounds include a polyalkylene ether diol, a polyalkylene ether triol, and a polyester polyol.

U.S. Pat. No 5,606,003 discloses an adhesive containing isocyanate terminated prepolymer component comprising the reaction product of one or more polyols, and one or more polyisocyanates, and a curative component comprising one or more polyol curing agents, having sufficient hydroxyl functionality to form a crosslinked composition when reacted with the isocyanate terminated prepolymer component, and optionally one or more polyamines. The improvement consists of the presence of at least 80 wt. % of one or more polyols used to the isocyanate terminated prepolymer component are one or more grafted poly (alkylene oxide) polyols formed from grafting reactions of poly(alkylene oxide) polyols with acrylonitrile.

Two-component polyurethane adhesives are becoming increasingly useful to adhere structural substrates such as reinforced plastics, metals, wood, and glass. These adhesives can be dispensed either in a gravity flowable state or a non-sag shear-thinning paste system, wherein one component is composed of an isocyanate or isocyanate prepolymer and the second component contains a mixture of a polyhydroxy compounds free of isocyanate groups.

It is known that sag resistance can be improved by incorporating on the curative side containing polyhydroxy components some low molecular weight di-or poly-primary or secondary amine. Thus, the polyurethane adhesive formed by blending the above two components in appropriate mix ratios provides a sag-resistant mixture having non-to-poor initial tack and peel strength, which upon heating or standing at room temperature build the adhesion by curing of polyols with the polyisocyanate.

In boat building, especially glass fiber boats, hulls, decks, stringers and bulkheads are typically made of reinforced fiberglass. The stringer system which is commonly made up of interlocking stringers and bulkheads is assembled outside of the boat, with interlocking pieces being held with staples. Once the system is assembled, it is then placed in a boat as a module and laminated into place using a combination of reinforcing fabrics. Conventional fiber reinforced plastic (FRP) assemblies can be joined mechanically, by adhesives, or by a combination of both. For example, in the assembly of boats, decks are integrally bonded to hulls. One manufacture method involves the so-called glassing-in technique for bonding the deck to the hull. Sheets or pieces of fiberglass fabrics are pre-impregnated with unsaturated polymer resin syrup containing free radical initiators. Glassing-in of the deck-to-hull perimeter is labor intensive and adds additional undesirable weight to the boat. The glassed-in bond is typically rigid and brittle.

Another technique of deck-to-hull assembly is the so-called through-bolting method. A one-component, moisture-curing urethane sealant is first applied around the deck-to-hull perimeter to provide a moisture seal, and bolts are used for structural strength. The sealant does not provide structural strength. It would be industrially important to simplify or eliminate the fastening steps and labor associated with the through-bolt and glassing-in techniques with structural adhesives that could provide both structural integrity and sealing of the bonded surfaces.

Conventional urethane adhesive systems are formulated for relatively rapid curing, e.g. under 15 minutes at ambient temperature in a large bead. The time prior to loss of workability, or wetability of the substrate, by the mixed adhesive is referred to as "open" or working time. An open time of about 15 minutes or less under ambient conditions can lead to difficulties for bonding of large parts, especially during warm seasons of the year. Furthermore, in the bonding of large parts, especially those structures having surface irregularities along the mating surfaces, a relatively large bead of adhesive is needed. The exotherm from a reactive two-part urethane particularly applied in a large cross-sectional area bead, e.g. greater than or equal to about 2 cm.×2 cm., in warm ambient conditions, further reduces the open time of conventional adhesives.

It would be industrially advantageous to provide a structural reactive urethane adhesive system that provides a longer open time, that is at least about 25 minutes at 32° C. in a large bead without sacrificing cured bond strength while curing under ambient conditions.

SUMMARY OF THE INVENTION

In accordance with the invention, a two-part, 100% solids, non-foaming, ambient curable structural urethane adhesive is described which enables the laying down of a large adhesive bead under warm ambient conditions with an open time of at least 25 minutes, more preferably 50 minutes, which enables the manual joining of large structural components with large adhesive beads, and where the assembled structure requires high cured bond strength. The invention resides in a two-part urethane adhesive comprising on the A side a polyisocyanate or isocyanate prepolymer and on the B-side a combination of polyols. The polyols used on both sides comprise at least 75% of polyols containing secondary hydroxyl groups.

The two-part polyurethane structural adhesive according to the invention exhibit at least 25 minutes of open time at 32° C. in a large cross-sectional area bead, and cure to high strength under ambient conditions as a composition comprising in one part a isocyanate and/or isocyanate prepolymer made with a secondary polyol, and in a second part, a polyol mixture (I) or (II), wherein 75% to 100% by weight of the polyol mixture (I) or (II) are polyols having secondary hydroxyl functionality and the polyol mixture (I) or (II) contains a long chain polyol defined hereinbelow. The polyol mixture (I) is substantially absent short chain polyols having functionality of 2, and includes a) an amount from 30% to 80% by weight on total polyol weight in (I) of long chain polyol of molecular weight from 2000 to 12000, b) and from 20% to 70% by weight on total weight of the polyol mixture of a short chain polyol with functionality greater than 2 and a molecular weight of from 90 to 800; and mixture (II) comprises a) an amount from 5% to 80% of the long chain polyol of molecular weight of from 2000 to 12000 together with b) an amount from 5% to 70% by weight of said mixture of a short chain polyol having a functionality of greater than 2 and a molecular weight of from 90 to 800, and c) an amount from 5% to 70% of a short chain polyol having a functionality of 2 and a molecular weight of from 90–800.

In another aspect, the invention is directed to a method for joining two substrates, e.g., two structural members, by mixing the first and second parts of the adhesive, applying the mixture to the substrate bonding site, joining the substrate members, and allowing said adhesive to cure under ambient conditions. The invention is particularly adaptable for bonding large composite parts. One such bonding application is joining of a boat deck to stringer. The size of the boat can be between 6 and 30 meters. The adhesive joints can be 2 to 15 cm in diameter and 0.5 to 10 cm in height along the stringer perimeter. The long open time of this invention accommodates the irregularity of the deck-to-stringer bonding gaps. When the two mating surfaces have a tighter tolerance (smaller and even gap in between), the bond-line thickness can be reduced, such as down to 0.8 to 2.5 mm.

The two-part urethane adhesive provides sufficient time to dispense adhesive, position, and align the parts to be joined under ambient conditions, particularly during summer months.

DETAILED DESCRIPTION OF THE INVENTION

Isocyanate Component

Suitable multifunctional isocyanates include aliphatic, cycloaliphatic, and/or aromatic polyisocyanates containing at least two isocyanate groups per molecule. Owing to their good resistance to UV light, aliphatic diisocyanates yield products of low tendency to yellowing, but are more costly compared to aromatic polyisocyanates. The isocyanate component in the first part can essentially be any aliphatic or aromatic, cyclic or linear, organic isocyanate compound having an isocyanate functionality from two to four, preferably from two to three. The polyisocyanate component needed in the adhesive mixture can also contain a proportion of polyisocyanates of functionality greater than 2. Triisocyanates can be obtained by trimerization or oligomerization of diisocyanates or by reaction of diisocyanates with polyfunctional compounds containing OH or NH groups.

The isocyanates can be of low, high, or intermediate molecular weight and can be any of a wide variety of organic polyisocyanates. Typical aliphatic isocyanate compounds useful herein include hexamethylene diisocyanate, e.g. 2,2, 4-trimethylhexamethylene-1,6-diisocyanate, and hexamethylene-1,6-diisocyanate (including dimers and trimers thereof), ethylene diisocyanate, trimethylene diisocyanate, dodecamethylene diisocyanate, hexamethylene diisocyanate, tetraethylene diisocyanate, pentamethylene diisocyanate, propylene-1,2-diisocyanate, 2,3-dimethyl tetramethylene diisocyanate, butylene-1,3-diisocyanate, butylene-1,3-diisocyanate, 1,4-diisocyanato cyclohexane, ethylethylene diisocyanate and trimethylhexane diisocyanate, and the like. Polyisocyanates having an isocyanate functionality of at least two are disclosed in U.S. Pat. Nos. 3,350,362 and 3,382,215. Polyisocyanates which are polymeric in nature including isocyanate prepolymers of all types are included in this invention.

Cycloaliphatic polyisocyanates include cyclobutane diisocyanate, cyclopentylene diisocyanate, e.g., cyclopentene-1,3-diisocyanate, cyclohexylene diisocyanate, e.g. methylcyclohexylene diisocyanate, dicyclohexylmethane diisocyanate, e.g. bis(4-isocyanatocyclohexyl) methane, and 1,4-cyclohexane diisocyanate, e.g. 1,4-bis(isocyanatomethyl)cyclohexane.

Examples of aromatic polyisocyanates which can be used are phenylene diisocyanate, toluene diisocyanate, xylylene diisocyanate, isomers of bisphenylene diisocyanate, isomers of naphthylene diisocyanate, isomers of diphenylmethane diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4-diisocyanate, xylene-1,3-diisocyanate, 4,4'-diphenylene methane diisocyanate, 4,4'-diphenylene propane diisocyanate, and polymethylene polyphenyl isocyanate.

The isocyanate compound has a molecular weight of from 100 to 1000, preferably a molecular weight of between about 160 and 600, more preferably between about 200 and 500. Preferredly in the first or A-side, adjustment of viscosity can be achieved by incorporation of a proportion of isocyanate capped prepolymer in combination with non-chain-extended isocyanate is used. The isocyanate compound is utilized in the present invention in an amount ranging from about 20 to 70 percent, preferably from about 30 to 65 percent by weight of the total adhesive composition.

Polyol Components

The polyhydroxy compounds in the second part are used for reacting with the isocyanate compound in the first part, and are mixtures primarily comprising predominantly short and long chain secondary polyols. Optionally, no more than about 25 weight percent of the polyol mixture can consist of primary polyols. More preferably no more than 15 wt % of the polyol mixture contains primary polyols, and, the most preferred limit of primary polyols present is at most about 5 wt % on total polyol weight by weight of total polyols.

Long Chain Polyols

The term "long chain" refers to a polyol having a molecular weight of from 2000 to 12000. Long chain polyols include the broad classes of polyether, polyester, polycaprolactone, polycarbonates, acrylic polyols, and polybutadiene types, and the like. The functionality of the long chain secondary polyol is not critical. The functionality of long chain secondary polyols can range from 1.6 to about 4. The long chain polyol used herein are predominantly secondary polyols, preferentially polyether polyols capped or terminated with a secondary hydroxyl group through addition of, for example, propylene oxide, and most preferably containing solely polyoxypropylene groups. A weight amount no more than 25% of primary hydroxy groups can be included such as polyols terminated with ethylene oxide in the amount from 1 to 25 weight percent. Preferably the amount of primary polyol is no more than 15%, and more preferably no more than 5%.

Included among the polyether polyols are polyoxyethylene glycol, polyoxypropylene glycol, polyoxybutylene glycol, polytetramethylene glycol, block copolymers, for example combinations of polyoxypropylene and polyoxyethylene poly-1,2-oxybutylene and polyoxyethylene polyols, poly-1,4-tetramethylene and polyoxyethylene polyols, and copolymer polyols prepared from blends or sequential addition of two or more alkylene oxides. The polyalkylene polyether polyols may be prepared by any known process such as those prepared by polymerization of epoxides such as ethylene oxide, propylene oxide, butylene oxide, tetrahydrofuran, styrene oxide, or epichlorohydrin either alone or by chemical addition to other materials such as ethylene glycol, propylene glycol, trimethylol propane, 4,4'-dihydroxy diphenyl propane, and the like. Sucrose polyethers also may be used. Polyether polyols are available globally from Bayer, BASF, and Dow.

Alternative to the polyether polyols are polyester polyols such as those formed by the reaction of lactones or carboxylic acids with multi-functional hydroxy compounds. The carboxylic acid-based polyester polyols of the invention can be prepared according to methods known in the art by reacting carboxylic acids such as succinic acid, adipic acid, suberic acid, azelaic acid, sebacic acid, phthalic acid, isophthalic acid, or terephthalic acid with multi-functional hydroxy compounds such as ethylene glycol, diethylene glycol, 1,4-butane diol, 1,3-propane diol, 1,6-hexane diol, trimethylol propane, glycerol, erythritol, pentaerythritol, poly(ethylene oxide) diol, poly(ethylene oxide/propylene oxide) diol, and poly(tetramethylene oxide) diol in various combinations well known in the art. Presently preferred carboxylic acid-based polyester polyols include 1,6-hexane diol phthalate polyester diol, 1,6-hexane diol adipate diol, and 1,6-hexane diol ethylene glycol adipate diol.

Polyester polyols are commercially available globally from Bayer, Stepan, and Ruco.

Lactone-based polyester polyols are prepared according to methods known in the art by reacting a lactone such as caprolactone with a multi-functional hydroxy compound as defined immediately above. A particularly preferred lactone-based polyester polyol, which is also preferred over the carboxylic acid-based polyester polyols in general, is a polycaprolactone triol prepared from the reaction of caprolactone and trimethylol propane.

Lactone-based polyols are commercially available from Union Carbide and Solvay Interox.

Polybutadienes having hydroxyl groups as well as other known hydroxyl containing vinyl addition type polymers can be used as polyols in this invention. Polyols based on polybutadiene are commercially available globally from ElfAtochem.

Short Chain Polyols

The mixed polyol system utilizes a defined weight proportion of short chain secondary polyol having functionality of 2 to 4 and a molecular weight of from 90 to 800 which is critical. The term "short chain" refers to a polyol with a molecular weight of from 90 to 800.

Short chain secondary diols having functionality=2, include diols having at least 4 carbon atoms, e.g., 2,3-butane diol, 2,5-hexane diol, 2,6-heptane diol, propoxylated neopentyl glycol. The short chain secondary polyols having functionality greater than two can be triols, e.g. trimethylol propane, tetra-ols, e.g. pentaerythritol, and the like, and can also include secondary polyalkylene ether triols, tetra-ols, and the like. The polyalkylene ether triols can be prepared by reacting cyclic ethers such as alkylene oxides (e.g. propylene oxide, butylene oxide, etc.), tetrahydrofuran, or dioxolane with trifunctional hydroxy compounds such as trimethylol propane, 1,2,6-hexane triol, glycerol, and the like in ring-opening reactions well known in the art. Typical polyalkylene ether triols include polypropylene ether triol, polybutylene ether triol, polyethylene ether triol, polytetramethylene ether triol, and polyethylene propylene ether triol, with trimethylol propane polyproxylate being most preferred.

Polyol Mixtures (I) and (II)

The polyol mixture according to the invention embodiments (I) or (II), contain 75% to 100% by weight of the polyol mixture (I) or (II) as secondary hydroxyl functional polyols. The polyol mixture (I) or (II) contains a long chain secondary polyol. The polyol mixture (I) is substantially absent short chain polyols having functionality=2. "Substantially absent", where indicated, means that the amount of short chain polyol of functionality=2 is minimal, but may be analytically detectable, and occurs typically as a by-product of statistical polymerization processes.

Mixture (I) includes an amount from 30% to 80% by weight of total polyol weight in (I) of long chain secondary polyol of molecular weight from 2000 to 12000, preferably 4000 to 12000, and from 20% to 70% by weight of total weight of the polyol mixture of a short chain secondary polyol with functionality greater than 2 and a molecular weight of from 90 to 800, preferably 90 to 500. The preferred weight proportion in (I) of short chain secondary polyol having functionality greater than 2 is from 25% to 65% by weight of (I), and more preferably a proportion of 30% to 60% by weight of (I). The preferred weight proportion of long chain secondary polyol in (I) is from 35% to 75%, and the more preferred weight proportion of long chain secondary polyol in (I) is from 40% to 70%.

The polyol mixture of embodiment (II) comprises a weight amount from 5% to 80% of the long chain secondary polyol of molecular weight of from 2000 to 12000, preferably 2000 to 8000, more preferably from 3000 to 6000, together with a weight amount of from 5% to 70% of said mixture of a short chain secondary polyol having a functionality of greater than 2 and a molecular weight of from 90 to 800, and an amount from 5% to 70% of a short chain secondary polyol having a functionality=2 and molecular weight of 90 to 800. The preferred proportion of short chain secondary polyol having functionality greater than 2 is from 10% to 60% by weight of (II), more preferably a proportion of 20% to 50% by weight of (II). The preferred weight proportion of short chain secondary polyol having functionality=2 is from 5% to 50% by weight of (II), and more preferably a proportion of 10% to 40% by weight of (II). The preferred weight proportion of long chain secondary polyol in (II) is from 10% to 70%, and the more preferred weight proportion of long chain secondary polyol in (I) is from 20% to 60%.

This polyol combination in the proportions specified below is critical to providing an extended open time of at least 25 minutes at 32° C. ambient in a large (2×2 cm and larger) bead while providing high bond strength between the joined substrates. In the mixed polyol system, if the specified amount of secondary short chain polyol having functionality greater than 2 is exceeded, adhesive open time drops below the desired level. Utilizing an amount of the short chain polyol having functionality greater than 2 less than specified yields too low cured mechanical strength and poor bond performance.

The preferred combination of polyols in (II) comprises:

1) from about 30% to 70%, preferably about 40 to 60 wt. % of long chain secondary polyol having a molecular weight of from 2000 to 8000; and 2) from 70% to 30%, preferably 60 to 40% wt. % of a short chain secondary polyol having a hydroxyl functionality of from 2 and 4 and a molecular weight of from 90 to 800, most preferably 90 to 500.

With 100 equivalents of—NCO on the resin A-side, a range of the—NCO/—OH—NH, as mole ratio is 1 to 1.6. The preferred mole ratio is from 1.0 to 1.4.

The most preferred long chain secondary polyol has an average hydroxyl functionality of about 2.6 and a molecular weight of from about 4100–4200. In the most preferred embodiment (II), there is a combination of secondary short chain diol and triol with a molecular weight of from 200 to 400. The preferred short chain diol is neopentyl propoxylate with hydroxyl functionality of 2 and molecular weight of 220; and the most preferred triol is propoxylated trimethylolpropane having a hydroxyl functionality of 3 and a molecular weight of 275. Secondary polyols are commercially available globally from Bayer, BASF, and Dow.

Optionally, the polyol mixture can contain no more than about 10 wt. % of a diamine, preferably optionally up to about 6 wt. % diamine, and more preferably no more than about 3 wt. %. Examples of diamines are secondary aromatic diamines, primary aromatic diamines, 3,3'-di-and/or 3,3'-, 5,5'-tetraalkyl-substituted diaminodiphenylmethanes. Specific secondary aromatic diamines are N,N'-dialkyl-substituted aromatic diamines, which are unsubstituted or substituted on the aromatic ring by alkyl radicals, having 1 to 20, preferably 1 to 4, carbon atoms in the N-alkyl substituent, e.g., N,N'-diethyl-, N,N'-di-sec-pentyl-, N,N'-di-sec-hexyl-, N,N'-di-sec-decyl-, and N,N'-dicyclohexyl-p- and m-phenylenediamine, N,N'-dimethyl-, N,N'-diethyl-, N,N'-diisopropyl-, N,N'-disec-butyl- and N,N'-dicyclohexyl-4,4'-diaminodiphenylmethane and N,N'-di-sec-butylbenzidine Catalyst Optionally, up to about 2.0 wt. % of a catalyst is used. The preferred catalysts are referred to as delayed-action catalysts. These include those catalysts known to facilitate a chain propagating and crosslinking reaction in the adhesive, such as between amines and isocyanates, and/or between polyols and isocyanates. The catalyst compounds, known in the art, include tin catalysts, such as dialkyl tin mercaptides, dialkyltin mercaptoacetates, and dialkyltin dimercaptoacids, including mixtures. Specific exemplary tin catalysts include dibutyltin dilaurate, dibutyltin diacetate, tin (II) acetate, tin (II) octanoate, tin (II) ethylhexanoate, tin (II) laurate, diethyltin diacetate, dibutyltin diacetate, dibutyltin dilaurate, dibutyltin maleate, dihexyltin diacetate, dioctyltin diacetate, and dibutyltin diisooctyl maleate. Dialkyl tin mercaptides include dimethyltin dimercaptide, and dibutyltin dimercaptide, and dioctyltin dimercaptide. Dialkyltin mercaptoacetates include dibutyltin diisooctyl mercapto acetate, and mixtures. Also suitable are ferric acetonate, nickel acetylacetonate. Tin catalyst can be used at 0.001 to 0.5 wt. %. Tin catalysts are commercially available from Air Products and Chemical.

The tertiary amine and organoacid-blocked tertiary amine delayed action catalysts are well known. Suitable organic carboxylic acids used to block a tertiary amine catalyst include mono- or dicarboxylic acids having 1–20 carbon atoms, such as formic, acetic, propionic, butyric, caproic, 2-ethyl-hexanoic, caprylic, cyanoacetic, pyruvic, benzoic, oxalic, malonic, succinic, and maleic acids, with formic acid being preferred. Specific tertiary amines include N,N',N"-dimethylaminopropylhexahydrotriazine, and 1,4-diazabicyclooctane. N,N, N',N'-tetramethyl hexamethylene diamine. Others include organic acid blocked dimethyl cyclohexylamine, an organic acid blocked triethylenediamine, an organic acid blocked N-methyl morpholine, an organic acid blocked N-ethyl morpholine, an organic acid blocked dimethylbenzylamine, or an organic acid blocked tetramethylethylenediamine. Amine catalysts can be used at from 0.25% to 2% by weight. Some suitable commercial delayed action catalysts are available under the trademarks DABCO and FOMREZ.

Also optionally suitable as a delayed action catalyst are the various catalytic organometallics such as derived from zinc, potassium, bismuth.

As is known in the art, various conventional additives are optionally included, such as fillers, extenders, plasticizers, rheology modifiers, pigments, glass spheres, inhibitors, antioxidants, and the like. Typical fillers include silicates, talc and clay, calcium carbonate, alumina, silica, molecular seives, and the like; inorganic and/or organic pigments include $TiO_2$, etc.; typical plasticizers include phthalates, adipates, azelates, and the like; and typical antioxidants include hindered polyphenols such as the antioxidants sold under the tradenames IRGANOX and AOX by Ciba Specialty Chemicals. Exemplary commercial UV stabilizers are available from Ciba Specialty Chemicals under the tradename TINUVIN.

The adhesive compositions of the present invention can be applied to bond various materials and substrates together or to different material compositions, including woven and nonwoven fabric, wood, metal, leather, plastics, and polymer composites, e.g., sheet mold compounds or composites (SMC), as glass reinforced thermoset compositions, and other fiber reinforced thermoplastics (FRP). The invention exhibits excellent adhesion performance towards a variety of flexible, semi-structural, and structural substrates including polyester fabric, polyester foam, polystyrene foam, nylon, urethane elastomers and thermosets, urethane foams, steel, aluminum, plywood, glass and ceramics, and the like.

The present adhesive compositions produce adhesive bonds which withstand environmental conditions such as high humidity and prolonged contact with salt water, oil, fuels, and battery acid. The adhesives may be readily adapted with minor modifications so as to be useful as ambient cure coatings, sealants, and primers for adhesives, etc.

The adhesive system can be readily dispensed in a gravity feed apparatus, well known and used in the art. Formulations having viscosity of both the isocyanate resin side and the polyol curative side of about 8,000 to about 30,000 cps allow the direct application of the adhesives into conventional gear-driven meter-mix-dispensing equipment. The adhesive mixture upon application to substrates are preferably formulated to exhibit sag resistance as is known in the art by inclusion of diamines as is known in the art.

Alternatively, the adhesive can be adapted in the form of a paste, and dispensed with transfer pumping equipment well known and used in the art. The adhesive mixture upon application to substrates are preferably formulated to exhibit sag resistance as is known in the art.

In the paste adaptation, sag-resistance is achieved via physical thixotropy. Useful inorganic and organic thixotropes suited for adapting a paste form include silicas, organoclays, and some polymeric thixotropes like polyether polyols, polyether urea polyurethane, polyamides, etc. Both the isocyanate resin side and the curative side are readily shear-thinning and easy to pump.

The following examples are presented in order to further illustrate the invention, but are not intended to limit, in any manner, the scope of the invention.

Batch Preparation of Adhesive

A-side:

Fillers are dried in an oven for at least about 12 hours prior to use.

A jacketed mixer is heated to a set point of 60° C.

Isocyanate and prepolymer are charged under nitrogen. The charge is slowly stirred for 20 minutes, followed by charging portions of filler and additives. Planetary and dispersing blades are used for mixing under nitrogen for 60 minutes, followed by planetary blade only for cooling.

B-Side:

Fillers are dried in an oven for at least about 12 hours prior to use.

A jacketed mixer is heated to a set point of 60° C.

Polyols are charged into the mixer along with any additives and catalyst and mixed until the thixotrope is dissolved. Filler, pigment, and rheology modifier are introduced in small portions. Planetary and dispersing blades are used for mixing for 60 minutes under vacuum.

Planetary blade mixing is used under vacuum until batch is cool.

Lap Shear Testing

The following test methods were utilized in evaluating adhesive strength to substrates tested, e.g. FRP and metals. D1002-99 is the standard test method for apparent shear strength of single-lap-joint of adhesively bonded metal specimens by tension loading (metal-to-metal); ASTM D5868-95 Standard Test Method for Lap Shear Adhesion for Fiber Reinforced Plastic (FRP) Bonding; D5573-99 Standard Practice for Classifying Failure Modes in Fiber-Reinforced-Plastic (FRP) Joints.

The bonded samples are prepared by dispensing through a static mixer assembly onto one side of a substrate, generally a 2.54×10.16 cm coupon. Two coupons are bonded with an overlap of 2.54 cm for FRP and 1.27 cm for metal. The mated assemblies are allowed to cure before testing. Ambient temperature and relative humidity conditions are noted at the time of cure. The cured assemblies are placed in the mechanical jaws of a tensile tester, e.g. United Speedy Tester (United Testing Systems, Inc.) or Instron (Instron, Inc.). Tensile strength is recorded. The assemblies are characterized with respect to the failure mode.

Bead Open Time Determination

Adhesive bead open time was evaluated by pre-conditioning the adhesive to the testing temperature. A long bead of adhesive with 2.54 cm×2.54 cm dimension was drawn down on a cardboard. The cardboard with the adhesive was allowed to sit under the test condition in an oven or incubator at the specified temperature. At predetermined time intervals, the adhesive bead was examined for its bondability/wettability by running a wooden spatula through the bead and by checking the surface skin-over . The adhesive's open time is determined as either the skin-over time or the time the bulk of the bead loses its tackiness, whichever occurs first.

| | A-Side Formulation | | | | |
|---|---|---|---|---|---|
| Component | C1 | C2 | 3 | 4 | 5 |
| | Amount (wt. %) | | | | |
| Isocyanate | 43 | 55.5 | 55.5 | 55.5 | 55.5 |
| NCO prepolymer | 27 | 18.0 | 18.0 | 18.0 | 18.0 |
| Filler | 30 | 26.5 | 26.5 | 26.5 | 26.5 |
| Thixotrope | 1 | — | — | — | — |
| | B-Side Formulation | | | | |
| Component | C1 | C2 | 3 | 4 | 5 |
| | Examples | | | | |
| LC** polyol | 61.8 | 27.45 | 35.1 | 32.6 | 32.6 |
| SC polyol (F > 2)* | — | — | 34.5 | 22 | 22 |
| SC polyol (F = 2)* | 10 | 42 | — | 15 | 15 |
| Diamine | 1 | 1.14 | 1.14 | 1.14 | 1.14 |
| Catalyst | — | 0.01 | 0.01 | 0.01 | 0.001 |

-continued

| | | | | | |
|---|---|---|---|---|---|
| Filler | 22 | 16 | 16 | 16 | 16 |
| Pigment | — | 8 | 8 | 8 | 8 |
| Dessicant | 3.8 | 4 | 4 | 4 | 4 |
| Thixotrope | 1 | 1 | 1 | 1 | 1 |
| UV stab. | — | 0.4 | 0.2 | 0.2 | 0.2 |

| | Lap Shear strength to FRP (MPa) | | | | |
|---|---|---|---|---|---|
| Example | C1 | C2 | 3 | 4 | 5 |
| | 6.0 | 3.31 | 7.03 | 5.79 | 6.00 |

*short chain
**long chain

Control example 1 containing primary polyols provided sufficient lap shear strength, while C2 containing secondary polyols with no short chain polyol having functionality>2 has insufficient bond strength. C1, as the table below illustrates, provides insufficient open time of 15 minutes. The invention example 5 provides high bond strength and has long open time of 64 minutes at 32° C. in a 2.54 cm×2.54 cm bead.

| | Open time at 32° C., 2.54 × 2.54 bead dimension (min.) | | | | |
|---|---|---|---|---|---|
| Example | C1 | C2 | 3 | 4 | 5 |
| | 15 | — | — | — | 64 |

Adhesion to Polymeric Substrates

The evaluation of adhesive strength to different polymeric substrates is shown in the following table.

Failure mode description:

Fiber Tear (FT): glass fibers were pulled away from the substrate.
Resin Delamination (RD): a thin layer of resin was pulled away from the substrate.
Cohesive failure (COH): the bond failed through the adhesive.
Thin Layer Cohesive Failure (TLC): a thin layer of adhesive deposited on the substrate Adhesive failure (ADH): the bond failed at the adhesive and substrate interface.
Stock Break (SB): the substrate broke into two pieces. "Necking" means elongation of the substrate

| | | Lap shear strength (MPa); failure mode | |
|---|---|---|---|
| Substrate | Surface Prep. | Example C1 | Example 5 |
| FRP* | 80-grit sand | 6.0 | 6.0 |
| | | 30% FT/70% RD | 30% FT/70% RD |
| SMC | 80-grit scuff | 4.8 | 5.5 |
| | | 100% FT | 100% FT |
| Lexan ® | 80-grit scuff | 6.4 | 6.8 |
| | | 10% TLC/90% ADH | 100% Necking |
| Plexiglas | Dry rag wipe | 4.3 | 4.6 |
| | | 100% SB | 100% SB |
| ABS | Dry rag wipe | 4.9 | 4.9 |
| | | 100% SB | 100% SB |

*chopped glass and mat combination impregnated with ortho phthalate resin

Adhesion to Metals

Lap shear strength to metals was unexpectedly superior according to the adhesive of the present invention compared to the conventional 2-part urethane control C1 illustrated in the following table.

| | Lap shear strength (MPa) Failure mode | |
|---|---|---|
| Substrate | Example C1 | Example 5 |
| Q-Panel* 1010 CRS | 5.0 | 11.37 |
| | 100 ADH | 8 COH/92 ADH |
| ACT** 1010 CRS | 2.74 | 5.38 |
| | 100 ADH | 100 ADH |
| ACT HDG CRS | 2.32 | 3.81 |
| Hot dip galvanized | 100 ADH | 100 ADH |
| ACT ED5000 E-coated | 9.07 | 13.88 |
| Steel | 100 COH | 100 COH |
| Galvaneal steel | 4.81 | 8.57 |
| (National Steel) | 100 ADH | 85 ADH/15 COH |
| Q-Panel 6061 | 3.42 | 11.67 |
| Aluminum | 100 ADH | 10 COH/90 ADH |
| ACT 6111-T4 | 2.06 | 8.69 |
| Aluminum | 100 ADH | 19 COH/81 ADH |

*The Q-Panel Company, Cleveland, Ohio
**ACT Laboratories, Inc, Hillsdale, Michigan The foregoing discussion is an explanation of the details of the presently preferred embodiments of the present invention and does not in any manner limit the actual scope of the invention which is more appropriately determined by the following claims.

What is claimed is:

1. A two-part polyurethane structural adhesive composition adapted to exhibit a long open time, and comprising a diisocyanate in part A and in a second part B a polyol mixture (I) or (II), wherein 75% to 100% by weight of said polyol mixture (I) or (II) are polyols having secondary hydroxyl functionality, wherein
  said polyol mixture (I) comprises
    a) an amount from 30% to 80% of a long chain secondary polyol of molecular weight from 2000 to 12000 together with
    b) an amount from 20% to 70% by weight of said mixture of a short chain secondary polyol with functionality greater than 2 and a molecular weight of from 90 to 800, said (I) is in the substantial absence of short chairs polyol having a functionaly of 2, and
  said polyol mixture (II) comprises
    a) an amount from 5% to 80% of a long chain secondary polyol of molecular weight of from 2000 to 12000 together with
    b) an amount from 5% to 70% by weight of said mixture of a short chain secondary polyol having a functionality of greater than 2 and a molecular weight of from 90 to 800, and
    c) an amount from 5% to 70% of a short chain secondary polyol having a functionality of 2 and a molecular weight of from 90 to 800, and wherein said part A and part B combined exhibit at least 25 minutes of open time at ambient temperature.

2. The adhesive composition according to claim 1 wherein said secondary polyols are selected from the group consisting of polyether polyols, polyester polyols, polycaprolactone polyols, polycarbonates, acrylic polyols, and polybutadiene polyols.

3. The adhesive according to claim 1 wherein the secondary polyols having functionality greater than 2 of (I) b) and (II) b) are polyalkylene triols or tetra-ols.

4. The adhesive composition according to claim 1 wherein the proportion of secondary polyols in said polyol mixture is from 85% to 100%.

5. The adhesive composition according to claim 1 wherein the proportion of secondary polyols in said polyol mixture is from 95% to 100%.

6. The adhesive composition according to claim 1 wherein the isocyanate compound is selected from the group consisting of aliphatic, cycloaliphatic, and aromatic polyisocyanates.

7. The adhesive composition according to claim 1 wherein the proportion of short chain secondary polyol (I) b) is from 25% to 65% by weight of said polyol mixture (I), the proportion of short chain secondary polyol in (II) b) is from 10% to 60% by weight of said polyol mixture (II), the proportion of short chain secondary polyol in (II) c) is from 5% to 50% by weight of said polyol mixture (II), the proportion of long chain polyol in (I) a) is from 35% to 75% by weight of said polyol mixture (I), and the proportion of long chain polyol in (II) a) is from 10% to 70% by weight of said polyol mixture (II).

8. The adhesive composition according to claim 1 wherein the proportion of short chain secondary polyol (I) b) is from 30% to 60% by weight of said polyol mixture (I), the proportion of short chain secondary polyol in (II) b) is from 20% to 50% by weight of said polyol mixture (II), the proportion of short chain secondary polyol in (II) c) is from 10% to 40% by weight of said polyol mixture (II), the proportion of long chain polyol in (I) a) is from 40% to 70% by weight of said polyol mixture (I), and the proportion of long chain polyol in (II) a) is from 20% to 60% by weight of said polyol mixture (II).

9. The adhesive composition according to claim 1 further comprising a delayed action catalyst in an amount of 0.001 to 2% by weight.

10. The adhesive composition according to claim 1 wherein the equivalents of isocyanate function in said first part to hydroxyl function in said second part is in a mole ratio of 1 to 1.6.

11. The adhesive according to claim 3 wherein said secondary polyols are polyalkylene ether triols selected from the group consisting of polypropylene ether triol, polybutylene ether triol, polyethylene ether triol, polytetramethylene ether triol, and polyethylene propylene ether triol.

12. A method of bonding two substrates under ambient conditions comprising mixing the first and second parts of the adhesive as claimed in claim 1, applying said mixed parts to one substrate, joining the substrate with the other substrate, and allowing said adhesive to cure under ambient conditions.

13. A two-part polyurethane structural adhesive composition adapted to exhibit a long open time, and comprising in one part a diisocyanate and in a second part a polyol mixture (I) or (II), wherein 85% to 100% by weight of said polyol mixture (I) or (II) are polyols having secondary hydroxyl functionality, wherein said polyol mixture (I) comprises
 a) an amount from 30% to 80% of said long chain secondary polyol of molecular weight from 2000 to 12000 together with
 b) an amount from 20% to 70% by weight of said mixture of a short chain secondary polyol with functionality greater than 2 and a molecular weight of from 90 to 800, said (I) is in the substantial absence of short chain polyol having a functionality of 2; and said polyol mixture (II) comprises
 a) an amount from 5% to 80% of said long chain secondary polyol of molecular weight of from 2000 to 12000 together with
 b) an amount from 5% to 70% by weight of said mixture of a short chain secondary polyol having a functionality of greater than 2 and a molecular weight of from 90 to 800, and
 c) an amount from 5% to 70% of a short chain secondary polyol having a functionality of 2 and a molecular weight of from 90 to 800.

14. The adhesive composition according to claim 13 wherein said secondary polyols are selected from the group consisting of polyether polyols, polyester polyols, polycaprolactone polyols, polycarbonates, acrylic polyols, and polybutadiene polyols.

15. The adhesive according to claim 13 wherein the secondary polyols of (I) b) and II b) are polyalkylene triols or tetra-ols.

16. The adhesive composition according to claim 13 wherein the proportion of secondary polyols in said polyol mixture is from 95% to 100%.

17. The adhesive composition according to claim 13 wherein the isocyanate compound is selected from the group consisting of aliphatic, cycloaliphatic, and aromatic polyisocyanates.

18. The adhesive composition according to claim 13 wherein the proportion of short chain polyol (I) b) is from 25% to 65% by weight of said polyol mixture (I), the proportion of short chain polyol in (II) b) is from 10% to 60% by weight of said polyol mixture (II), the proportion of short chain polyol in (II) c) is from 5% to 50% by weight of said polyol mixture (II), the proportion of long chain polyol in (I) a) is from 35% to 75% by weight of said polyol mixture (I), and the proportion of long chain polyol in (II) a) is from 10% to 70% by weight of said polyol mixture (II).

19. The adhesive composition according to claim 13 wherein the proportion of short chain polyol (I) b) is from 30% to 60% by weight of said polyol mixture (I), the proportion of short chain polyol in (II) b) is from 20% to 50% by weight of said polyol mixture (II), the proportion of short chain polyol in (II) c) is from 10% to 40% by weight of said polyol mixture (II), the proportion of long chain polyol in (I) a) is from 40% to 70% by weight of said polyol mixture (I), and the proportion of long chain polyol in (II) a) is from 20% to 60% by weight of said polyol mixture (II).

20. The adhesive composition according to claim 13 further comprising a delayed action catalyst in an amount of 0.001 to 2% by weight.

21. The adhesive composition according to claim 13 wherein the equivalents of isocyanate function in said first part to hydroxyl function in said second part is in a mole ratio of 1 to 1.6.

22. The adhesive according to claim 15 wherein said secondary polyols are polyalkylene ether triols selected from the group consisting of polypropylene ether triol, polybutylene ether triol, polyethylene ether triol, polytetramethylene ether triol, and polyethylene propylene ether triol.

23. A method of bonding two substrates under ambient conditions comprising mixing the first and second parts of the adhesive as claimed in claim 13, applying said mixed parts to one substrate, joining the substrate with the other substrate, and allowing said adhesive to cure under ambient conditions.

24. The adhesive according to claim 1 wherein said part A further comprises an isocyanate capped prepolymer.

25. The adhesive according to claim 13 wherein said part A further comprises an isocyanate capped prepolymer.

* * * * *